Nov. 18, 1952 W. D. BOLLER ET AL 2,618,716

ELECTRIC CIRCUIT BREAKER

Filed June 10, 1948 6 Sheets-Sheet 1

INVENTORS
WILLIAM D. BOLLER
WARREN D. BERKLEY
WALTER ERNST
EDWIN W. LANDMEIER
BY
Toulmin & Toulmin
ATTORNEYS Nov. 18, 1952 W. D. BOLLER ET AL 2,618,716

ELECTRIC CIRCUIT BREAKER

Filed June 10, 1948 6 Sheets-Sheet 2

INVENTORS
WILLIAM D. BOLLER
WARREN D. BERKLEY
WALTER ERNST
EDWIN W. LANDMEIER
BY Toulmin & Toulmin
ATTORNEYS Nov. 18, 1952 W. D. BOLLER ET AL 2,618,716

ELECTRIC CIRCUIT BREAKER.

Filed June 10, 1948 6 Sheets-Sheet 3

INVENTORS
WILLIAM D. BOLLER
WARREN D. BERKLEY
WALTER ERNST
EDWIN W. LANDMEIER
BY Toulmin & Toulmin
ATTORNEYS INVENTORS
WILLIAM D. BOLLER
WARREN D. BERKLEY
WALTER ERNST
EDWIN W. LANDMEIER
BY
Toulmin & Toulmin
ATTORNEYS Nov. 18, 1952 W. D. BOLLER ET AL 2,618,716

ELECTRIC CIRCUIT BREAKER

Filed June 10, 1948 6 Sheets-Sheet 5

INVENTORS
WILLIAM D. BOLLER
WARREN D BERKLEY
WALTER ERNST
EDWIN W LANDMEIER
BY
Toulmin & Toulmin
ATTORNEYS Nov. 18, 1952 W. D. BOLLER ET AL 2,618,716

ELECTRIC CIRCUIT BREAKER

Filed June 10, 1948 6 Sheets-Sheet 6

INVENTORS
WILLIAM D. BOLLER
WARREN D. BERKLEY
WALTER ERNST
EDWIN W. LANDMEIER
BY
Toulmin & Toulmin
ATTORNEYS Patented Nov. 18, 1952 2,618,716

UNITED STATES PATENT OFFICE 2,618,716

ELECTRIC CIRCUIT BREAKER

William D. Boller, Milford, Ohio, Warren D. Berkley, Fort Wayne, Ind., Walter Ernst, Dayton, Ohio, and Edwin W. Landmeier, Covington, Ky., assignors to The Wadsworth Electric Mfg. Co., Covington, Ky., a corporation of Kentucky Application June 10, 1948, Serial No. 32,204

6 Claims. (Cl. 200—88)

This invention relates to circuit breakers, and is concerned primarily with a combination switch and circuit breaker intended to control the circuits in homes and comparable places.

At the present time, the electrical installations for homes, business establishments, and other places making use of the current supply that is made available by the electric companies includes one or more circuits, each of which embraces a fuse and sometimes a switch associated therewith. When the circuit is overloaded or a short circuit develops, the fuse burns out in a well-known manner and must be replaced before service can be restored.

The present invention has in view as its foremost objective the provision of a combination switch and circuit breaker which is intended to replace the fuse and switch heretofore employed in controlling such circuits.

Under practical conditions, a plurality of circuits are ordinarily included in electrical installations of the type with which this invention is concerned and a further object of the invention is the provision of a combination circuit breaker and switch which is susceptible of being assembled in multiple or gangs with each unit controlling one circuit.

In the known combination units of the type intended to be improved by this invention, it has been the practice to provide a pair of contacts for controlling the circuit. When these contacts are in engagement, the circuit is closed and when they are spaced apart, the circuit is open. Usually one of these contacts is fixed and the other is movable. The present invention has in view as an important object the provision of a combination switch and circuit breaker of the type indicated in which both of the contacts are movable. This arrangement presents certain definite advantages. It is possible to provide for the movement of one contact into opened or closed position under the influence of a manually operable lever while the other contact is placed under the control of the circuit conditions so as to be moved into opened position under overload or short circuiting conditions. This latter contact may be moved back into circuit closing position under the influence of the manually operable lever.

To the end of keeping the contacting surfaces clean a further object of the invention is the provision of a combination switch and circuit breaker of the type indicated in which the contacts are separated with a wiping action in contrast to a direct pull apart.

In circuit breakers of the type with which this invention is concerned, the opening of the contacts is placed under the control of a bimetallic thermostat together with a so-called "rupture" magnet that is affected by the current conditions to vary the strength thereof. The bimetallic thermostat is heated by overload conditions and when a predetermined condition is reached opens the contacts, whereas the rupture magnet is affected by a short circuit or other comparable instantaneous condition to immediately open the contacts. It has been the practice to mount the rupture magnet on the thermostat so that it is movable therewith. However, the present invention, in one embodiment, contemplates mounting of the rupture magnet in a fixed position in the casing and an armature which cooperates therewith is carried by a latch which controls relative movement of the contacts. This arrangement presents certain advantages not only as to ease of assembly but also in sureness of operation. With this arrangement, the rupture magnet is mounted with no physical connection between it and the bimetallic thermostat.

Still another object of the invention is the provision, in a combination switch and circuit breaker of the type aforesaid, of a novel assembly of a latch, keeper piece, and rivets which is highly simplified as compared to anything heretofore provided for this purpose.

Various other more detailed objects and advantages of the invention such as arise in carrying out the above noted ideas in a practical embodiment will in part become apparent and in part be hereinafter stated as the description of the invention proceeds.

For a full and more complete understanding of the invention reference may be had to the following description and accompanying drawings wherein.

*Preferred embodiment*

Figures 1, 2:
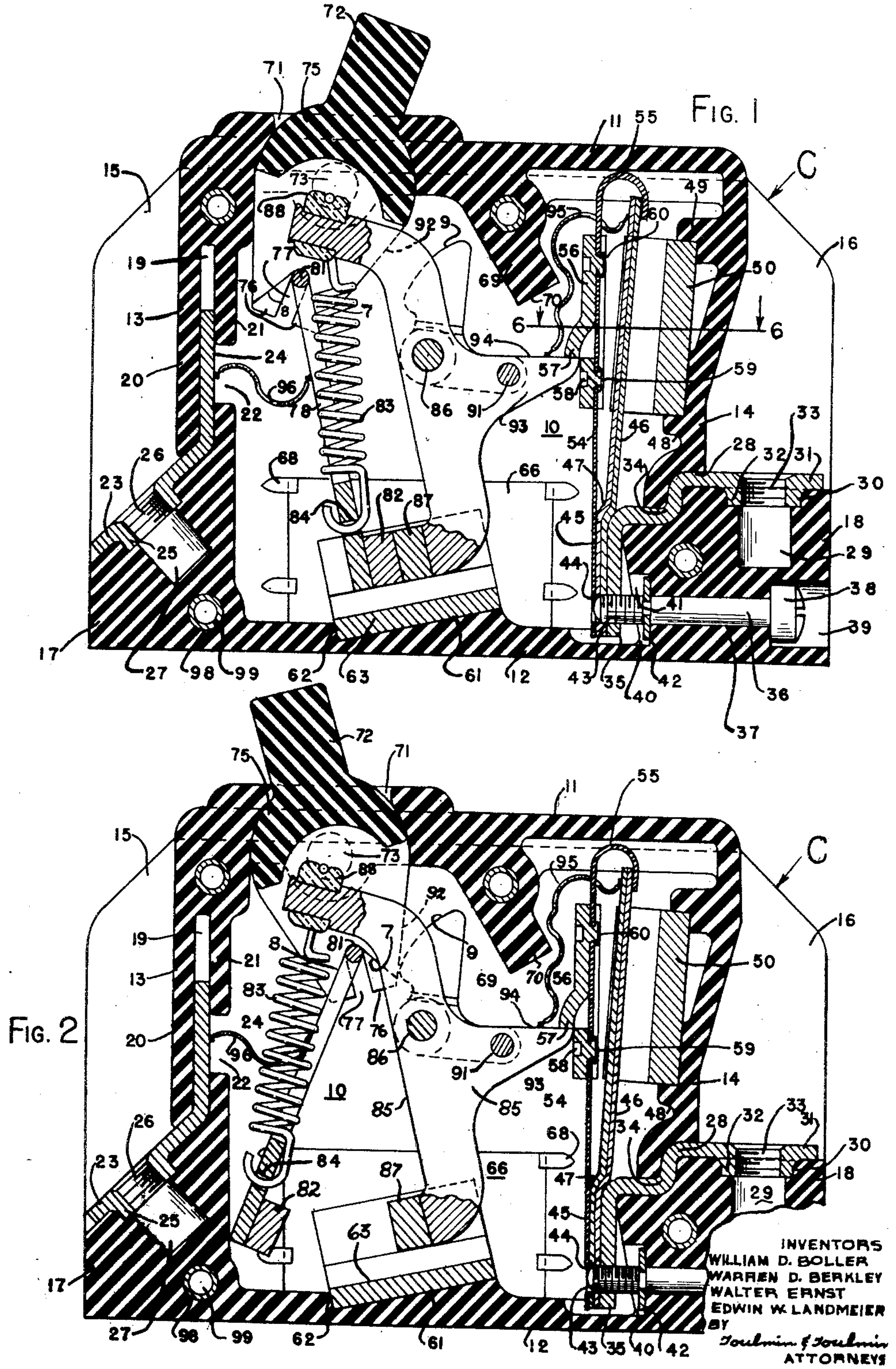
Figure 1 is a longitudinal vertical section through a combination switch and circuit breaker designed in accordance with the precepts of this invention and showing the unit in manually closed position.
Figure 2 is a sectional view similar to Figure 1 showing the unit in the manually opened position.

The preferred embodiment of the invention is illustrated in Figures 1 to 6, inclusive. In these views there is shown a casing which is referred to in its entirety by the reference character C and which is made from an appropriate material having good insulating properties and which is susceptible of being molded into the desired structural formation. There are available on the public market many synthetic plastics which will fulfill these qualifications. Among these is the phenol condensation product known as Bakelite.

The casing C comprises a main side wall 10, a top wall 11, a bottom wall 12, and end walls 13 and 14 which are spaced inwardly from the end edges of the side wall 10. All of these walls are integrally joined and the completed structure provides free end portions of the side wall 10 which are represented at 15 and 16 and immediately beneath which are the thickened wall structures 17 and 18.

The end wall 13 is formed with a slot 19 which defines an outer panel 20 which is relatively long and the end edge of which is spaced from the thickened wall structure 17. This slot 19 also defines an inner panel 21 which is relatively short and the end edge of which defines an opening at 22. A terminal plate 23 is formed at one end with an inclined flange 24 which is received in the slot 19. This terminal plate 23 is also formed with a neck 25 which is countersunk in a recess formed in the thickened wall structure 17. This neck 25 is interiorly threaded as represented at 26 to accommodate a binding post. The thickened wall structure 17 is also provided with a recess 27 beneath the threaded bore 26 to allow for screwing the binding post (not illustrated) home.

Referring now to the thickened wall structure 18 and end wall 14, it will be noted that these two elements are spaced apart by an irregularly shaped slot 28. The wall structure 18 is formed with a recess 29 that is counterbored as indicated at 30. Another terminal plate 31 has a neck 32 that is received in the counterbore 30 and the bore of which is threaded as indicated at 33, the threaded bore being located opposite to the recess 29. The threaded bore 33 and recess 29 accommodate another binding post. The terminal plate 31 is formed with an irregularly shaped part 34 that corresponds to and is received in the slot 28. Integrally connected to this part 34 is a flange 35 which is positioned within the chamber enclosed by end walls 13 and 14.

An adjusting screw 36 is received in a passage 37 formed in the thickened wall structure 18. This screw 36 has a head 38 which is positioned within an enlarged recess 39 that communicates with the bore 37. This head 38 may be slotted to accommodate a tool such as a screw driver.

The thickened wall structure 18 is formed with a recess 40 which communicates with the inner chamber of the casing and the bore 37. The adjusting screw 36 extends into this recess and immediately adjacent to the thickened wall 18 is formed with an annular groove 41 which receives a washer 42. This washer 42 and the head 38 hold the screw 36 against longitudinal movement. The free inner end of the screw 36 is threaded and screwed into an opening 43 formed in the flange 35 and also into an opening 44 formed in the end portion 45 of a bimetallic thermostat 46, this end portion 45 being offset from the main part of the bimetallic thermostat by a shoulder 47. It will be noted that this end portion 45 snugly engages the flange 35 of the terminal plate and is spot welded thereto.

Extending inwardly from the end wall 14 into the inner chamber are a pair of lugs 48 and 49 which are integrally formed with the wall 14. The opposing corners of these lugs 48 and 49 are cut away to provide recesses which receive a rupture magnet 50. This magnet 50 is of the U-shaped cross-section illustrated in Figure 6 and has legs 51 and 52, the outer faces of which are imbedded in the side wall 10 and cover to be later described. These side legs 51 and 52, together with the base, define a recess 53 through which the bimetal 46 passes. It is evident that current passing through the bimetal 46 will be effective on the rupture magnet 50 to vary the strength thereof for circuit rupturing purposes as will be later described.

A keeper piece 54 has its lower end anchored to the end part 45 of the bimetal 46 in any preferred manner such as by being spot welded thereto. The upper end of this keeper piece takes the form of a hook 55, the bill of which overlaps the end of the bimetallic thermostat 46. A latch member 56 which also functions as an armature for the magnet 50 is secured to this keeper piece 54. This latch member 56 is made from a metal having the required magnetic properties and it will be noted that a detent 57 is struck therefrom as by a metal stamping operation. The anchorage between the latch 56 and keeper piece 54 is effected by punching a pair of recesses 58 in one face of the latch 56. This forms small protuberances 59 on the opposite face. The keeper piece 54 is formed with openings which receive these protuberances 59. After the protuberances 59 pass through the openings they are peaned over to form what are in effect rivet heads 60.

The bottom wall 12 is formed with an inclined surface at 61 which opens into the inner chamber and which terminates at its lower end in a shoulder 62. A permanent magnet 63 of U-shaped formation has its base received on the inclined surface 61. The side legs of the magnet 63 have outer faces which are received in recesses 64 and 65 formed in the casing and cover, respectively. Also, fitted in these recesses and surrounding the sides of the magnet 63 are fiberboard frames 66 and 67 which are held in position by lugs 68 that are formed integral with the cover and casing respectively and which have end portions that overlaps the fiberboard frames.

The permanent magnet 63 is intended for arc suppressing purposes as will be later described and the fiberboard frames 66 and 67 accommodate the arc deposits which are formed by carbonizing which is an incident to the arc suppression. At this point, it is well to note that the strength of the permanent magnet 63 is related to the magnitude of the arc which will be created by the break of the contacts. The magnitude of the arc depends on the speed at which the contacts are broken and the strength of the current. There are now available permanent magnets having this required strength. Among such are the magnets sold under the trade name "Alnico."

Extending downwardly from the top wall 11 into the inner chamber is a projection 69 having an end face at 70 which is adapted to act as an abutment or stop as will be later described. This top wall 11 is also formed with an opening at 71, the end walls of which are formed as the cylindrical surfaces illustrated in the drawing. A manually operable lever 72 is formed with diametrically opposite projections 73 at each side thereof and these projections act as trunnions or pivots for mounting the lever 72. They are received in recesses 74 formed in the casing and cover, respectively, along the side edges of the opening 71. This lever 72 carries an arcuate wall structure 75 which is complemental to and snugly received within the curved end walls of the opening 71. This wall structure 75 completely closes the opening and at the same time permits swinging of the lever 72 about the trunnions 73 as a pivotal mounting.

Extending inwardly into the inner chamber and carried by the lever 72 are a pair of legs 76 which are spaced apart with the lower free edge of each leg formed with a notch 77. The inner face of each leg 76 is also formed with a V-shaped notch presenting inclined faces 8 and 7 that terminate at the lower edges of the leg. Thus the V-shaped notches are wider than the notches 77 and the faces 8 and 7 are adapted to function as stops in a manner now to be described.

A contact carrier 78 is of bifurcated construction defining a pair of legs 79 and 80 which are integrally joined at the bottom and from each of which outstands a pin 81 that is received in the respective notch 77. The lower end of this contact carrier 78 carries a contact 82. A tension coil spring 83 has its lower end anchored to the contact carrier 78 as represented at 84. The other end of this spring 83 is anchored to a rocker now to be described. It is evident that movement of carrier 78 about pins 81 is limited by the stop faces 8 and 7 on the legs 76.

Figures 3, 4, 5, 6:
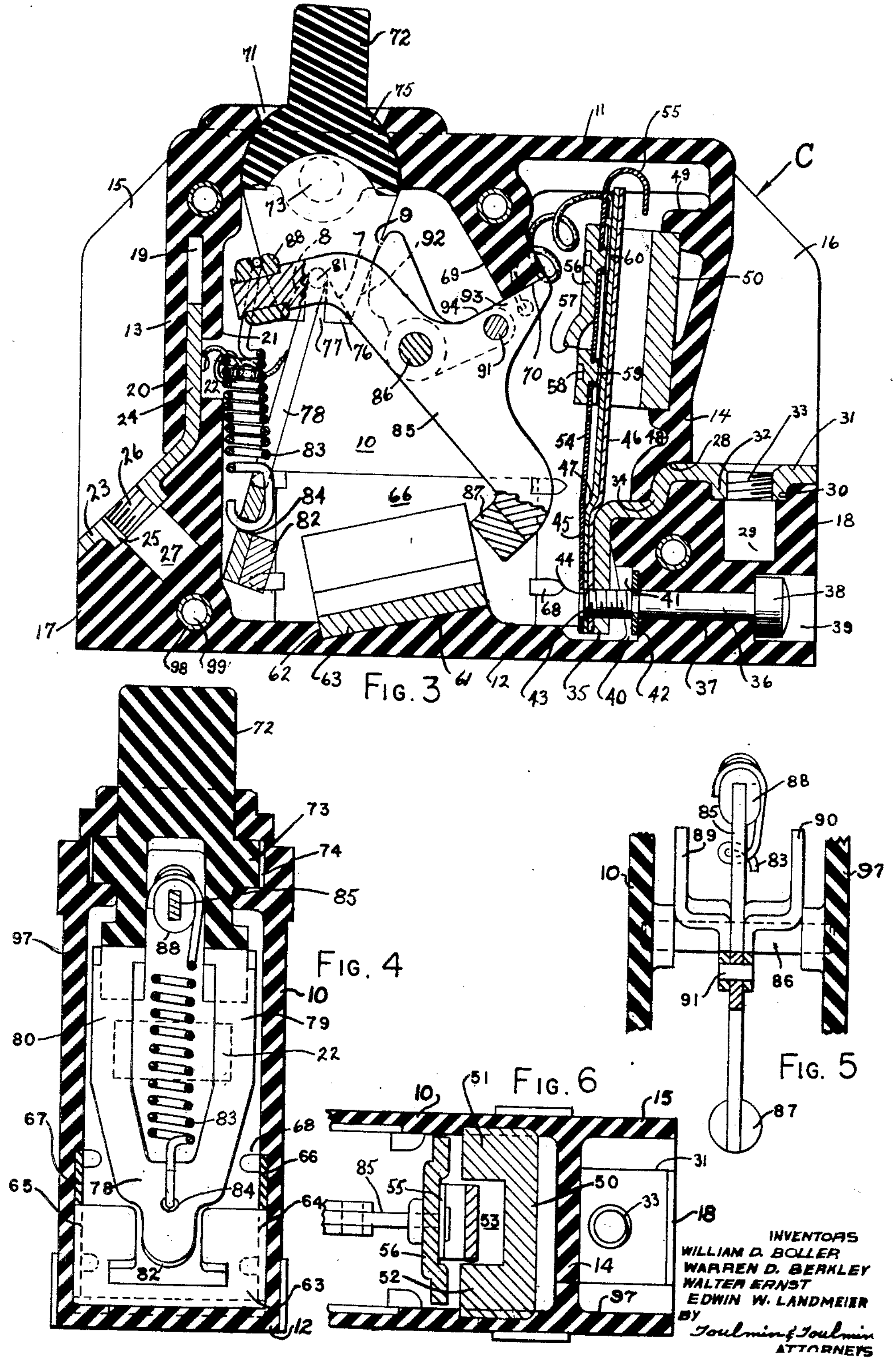
Figure 3 is another view similar to Figures 1 and 2 showing the unit in the opened position as caused by circuit conditions.
Figure 4 is a vertical section taken on a plane normal to the showing of Figures 1, 2 and 3.
Figure 5 is an enlarged detail view showing the rocker carrying one of the contacts in plan and the casing in section.
Figure 6 is another detailed view taken on a horizontal plane as represented by the line 6—6 on Figure 1.

A rocker 85 has trunnions 86 extending from opposite sides thereof and these trunnions are journaled in the cover and casing respectively as is brought out in Figure 5. The lower end of this rocker 85 carries a contact 87 which is complemental to and adapted to engage the contact 82. It is notable that the contact 82 is moved away from the contact 87 by a wiping action caused by the straightening of the lever 72 and carrier 78. This rocker is made of a good conducting material such as copper and its upper end is reduced in size to provide for the mounting of an insulating member 88 thereon. This insulating member may take the form of a glass ring and it functions as an insulated anchorage for the upper end of the spring 83. Mounted on opposite faces of the rocker 85 are a pair of brackets 89 and 90, the connection being effected by spot or resistance welding; the hole shown at 91 in Figure 5 serving as a locating point. Each of these brackets 89 and 90 is formed with a cam surface 9 which is adapted to cooperate with the respective side edge 92 of the leg 76.

The rocker 85 also carries an outwardly extending projection 93 having a face at 94 that is adapted to engage the abutment face 70. A flexible conductor 95 connects this projection 93 on the rocker 85 with the bimetal 46. Another flexible conductor 96 connects the contact carrier 78 with the terminal plate 23 passing through the opening 22 and being joined to the flange 24 in any preferred manner as by soldering.

The cover is shown at 97 and is preferably made from an insulating material having transparent properties and which is susceptible of being tinted to a desired shade for the purpose of designating the capacity of the unit. It will be noted that the end wall 13, thickened wall structure 17, thickened wall structure 18, and projection 69 are formed with openings, all of which are designated 98. The cover 97 is formed with openings that align with openings 98 and tubular fastening members 99 pass through the aligned openings. The ends of these tubular fasteners may be peaned outwardly in a well-known manner to provide what is in effect a riveted connection.

*Operation preferred embodiment*

In outlining the operation of the above described circuit breaker and switch unit, attention is first called to Figure 1 which depicts the condition of the unit when the circuit is closed. It will be noted that in this position the spring 83 being disposed at one side of the pins 81 urges the contact 82 against the contact 87 because movement of the rocker is prevented by the detent 57 which is in engagement with the surface 94 of the projection 93. In this position the upper end portion of the carrier 78 is in substantial engagement with the stop face 7. Under this condition, current will pass from the terminal plate 31 through the flange 35 thereof to the bimetal 46, conductor 95 connects the latter to the rocker. The current then passes from the rocker through contacts 87 and 82 to contact carrier 78 and from there through the conductor 96 to the terminal plate 23.

Figure 2 depicts the unit in the condition in which the circuit has been opened by manual operation of the lever 72. It will be noted that the contacts 82 and 87 have been moved apart with a wiping action to break the circuit. This has been achieved by movement of the contact 82 alone because the latch 57 still holds the rocker 85 against movement. As the lever 72 is swung from the position shown in Figure 1 to that shown in Figure 2, the pivot point 81 passes from the left-hand side of the center line of the spring 83 (speaking with reference to the showing of the drawings) to the right-hand side. This causes the spring 83 to bias the contact 82 away from the contact 87. It will be noted that this movement on the part of the lever 72 is accommodated because there is an appreciable space between the cam surfaces 92 and 9. Thus, the lever may be moved without affecting the rocker 85. In this position the upper end of the carrier 78 engages the stop face 8.

Figure 3 shows the condition of the unit which has been caused by circuit conditions to rupture the circuit by moving both the contacts 82 and 87. The circuit condition might either be an overload which affects the bimetallic thermostat 46 so as to move the keeper piece 54 and latch 56 carried thereby so that the detent 57 is withdrawn from the projection 93 or it may be a short circuit which will cause the rupture magnet 50 to have this effect on the latch member 56 which, it will be recalled, is also an armature for the magnet. Regardless of which may be the cause, when the detent 57 is withdrawn from the projection 93, the spring 83 being always under tension rotates the rocker 85 in a counterclockwise direction (speaking with reference to the showing of the drawings) and this movement is continued until the surface 94 engages the abutment surface 70. As this movement takes place, the contact 87 of course moves away from the contact 82. At the same time, the pivot pin 81 will be effected by the movement of the rocker arm to change its relative position with respect to the spring 83 and instead of being positioned on the left-hand side, as in the circuit closing position, its relative position is changed to the right-hand side and the contact 82 is also moved in the direction away from the contact 87.

As the contacts 82 and 87 move away from each other there ordinarily would be a tendency to arcing. However, this arcing is suppressed by the permanent magnet 63.

The position of the lever 72 after the circuit has been ruptured by circuit conditions is shown in Figure 3 which, it will be noted, is substantially intermediate the positions of Figures 1 and 2. In this position the cam surfaces 92 and 9 are in close proximity. Thus, when it is desired to reset the unit to close the circuit the lever 72 must first be swung in a counterclockwise direction to move the rocker 85 in a clockwise direction and again place the projection 93 under the retaining effect of the detent 57 of the latch 56. The lever 72 may then be swung into the circuit closed position shown in Figure 1.

*First modification*

An alternative embodiment of the invention is illustrated in Figures 7 to 21, inclusive. Aside from minor details which amount to little more than change in design the only real differences between the perferred form of the invention shown in Figures 1 to 6 and this alternative embodiment is in the mounting of the rupture magnet and the construction of the manually operable lever in which the arcuate construction of the preferred embodiment has been omitted.

Without repeating a description of the various elements which have been described in connection with Figures 1 to 6, inclusive, it is noted that the terminal plate 23 and end wall structure 13 are of a slightly different form. The flange 24 of the plate 23 is formed with an inturned lip 101 that projects into the inner chamber and which is connected by the flexible conductor 96 to the contact carrier 78. There is also a slight difference in the construction of the terminal plate 31 and the manner in which it is mounted in the end wall 14. It will be noted that the irregular slot 28 and structure 34 have been replaced by a straight slot 102 and a corresponding straight wall structure.

Instead of being fixedly mounted in the end wall 14 as in the form of Figures 1 to 6, inclusive, a rupture magnet 103 is mounted on the bimetal 46 by a rivet shown at 104. The armature for the magnet is shown at 105 and is anchored to one face of the keeper piece 54. The opposite face of the keeper piece 54 carries a latch 106. A rivet 207 extends through aligned openings in the latch 106, keeper piece 54, and armature 105 to maintain the assembled relation. Latch 106 has a detent 107 which corresponds to the detent 57.

The manually operable lever 72 is shown with the arcuate wall structure 75 omitted. This means that the opening at 108 which corresponds to the opening 71 also is devoid of the arcuate surfaces.

There is another difference in the construction of the upper portion of the rocker 85. Instead of having this entire upper portion of conducting metal and using the glass bead 88, the upper part of the rocker 85 is formed of insulating material such as represented at 109 in Figures 7, 8, 9, and 20. The upper end of the spring 83 is anchored to this arm 109 by being fitted in the notch 110.

Figure 19:
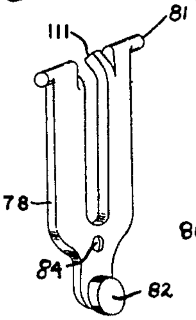
Figure 19 is a detailed perspective of one of the contact carrying members of the modified embodiment.
Figure 20:
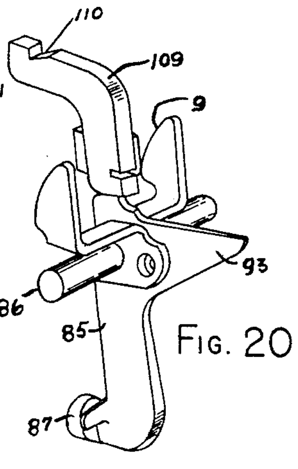
Figure 20 is another detailed perspective of the contact carrying rocker arm of the modified embodiment.
Figure 21:
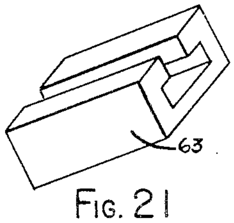
Figure 21 is a detailed perspective of the permanent magnet of the modified embodiment.

Upon referring particularly to Figure 19, it will be noted that the contact carrier 78 is of a bifurcated construction and small tabs 111 are struck from each side of the central slot. These tabs engage the leg 76 and prevent lateral or sidewise movement on the part of the contact carrier 78. This same arrangement is also employed in the preferred embodiment although it is not illustrated.

*Operation first modification*

Figures 7, 8:
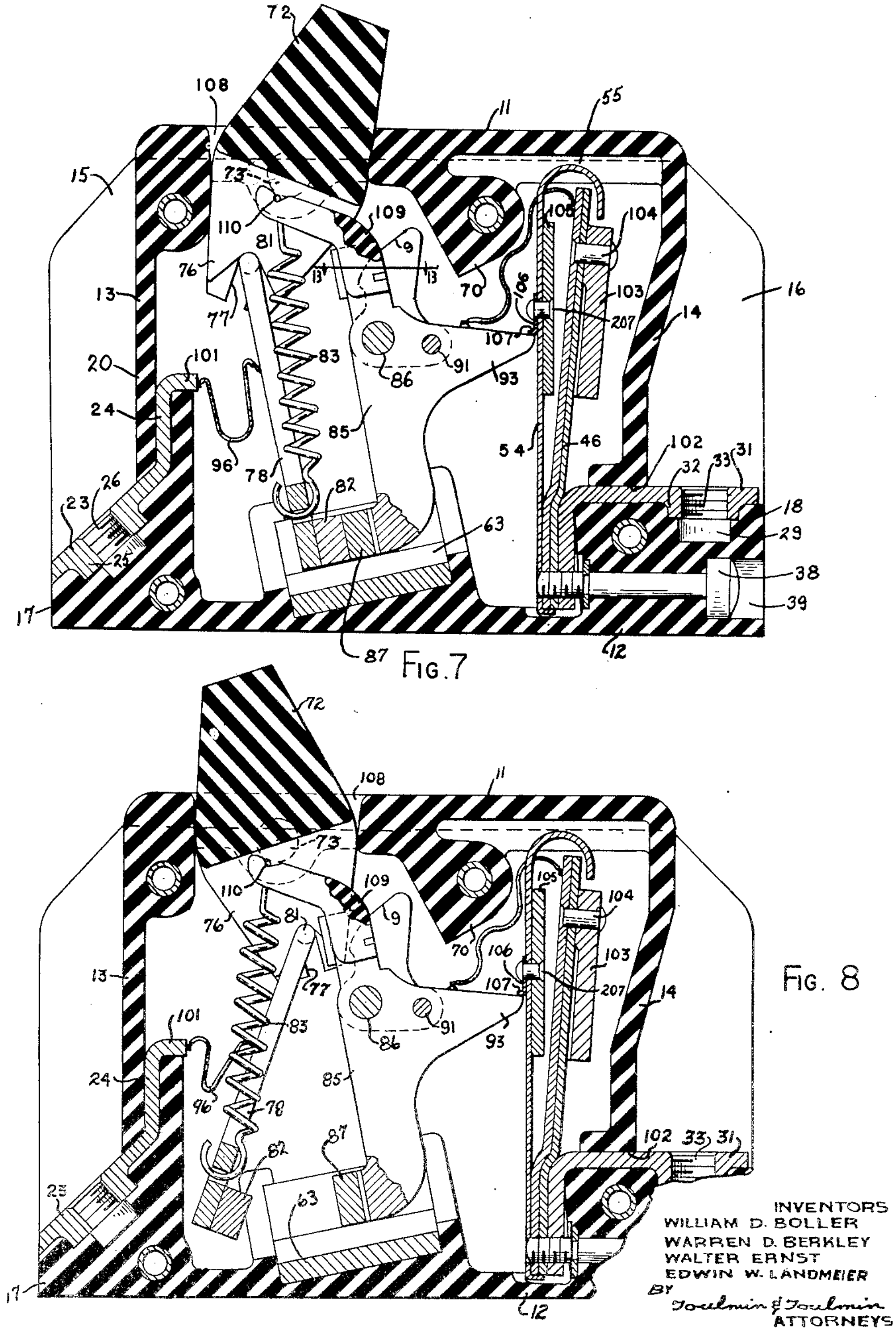
Figure 7 is a view similar to Figure 1 of a modified form of the invention showing the unit in its manually closed position.
Figure 8 is a view similar to Figure 2 showing the modified form of the unit in the manually closed position.
Figure 9:
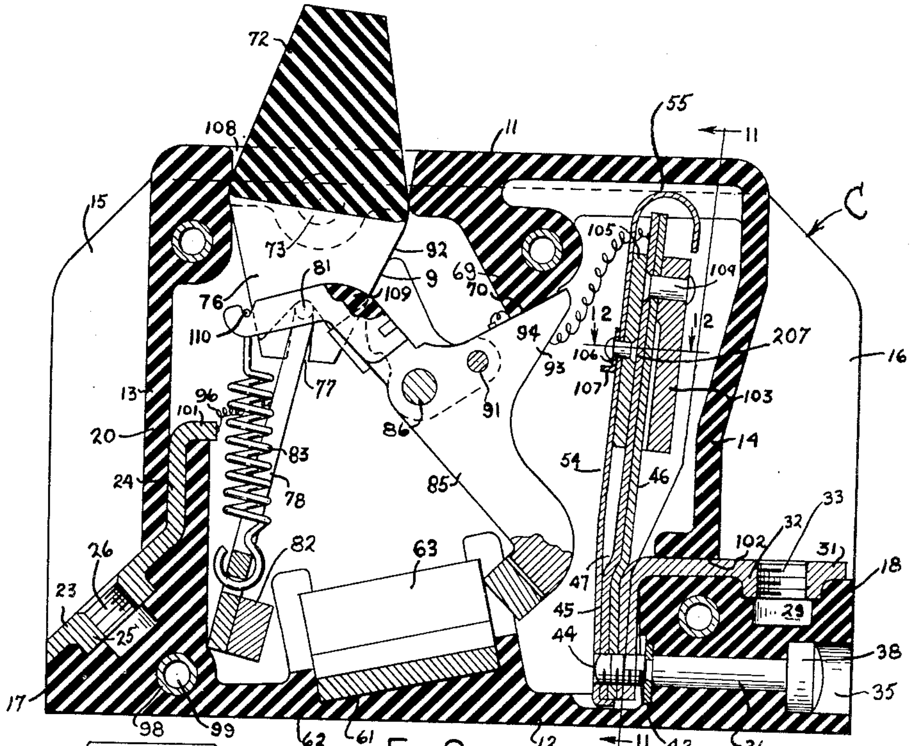
Figure 9 is a view similar to Figure 3 showing the modified unit of Figures 7 and 8 in the opened position caused by circuit conditions.
Figure 10:
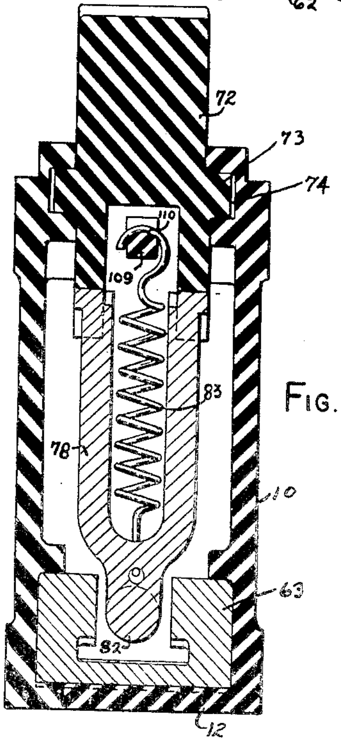
Figure 10 is a sectional view similar to Figure 4 of the modified form of Figures 7, 8, and 9 and is taken on a vertical plane normal to the showing of Figures 7, 8 and 9.
Figure 11:
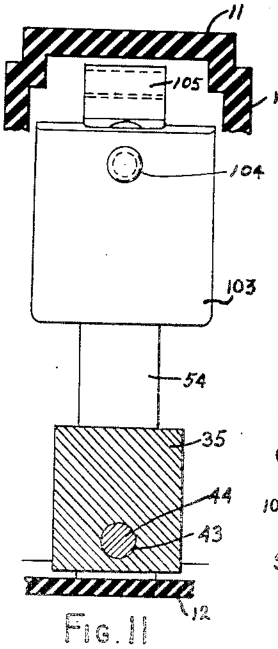
Figure 11 is a detailed section taken about on the planes represented by the lines 11—11 of Figure 9.
Figure 12:
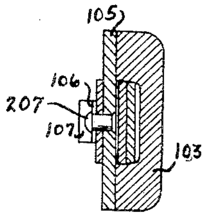
Figure 12 is an enlarged detailed section taken about on the plane represented by the line 12—12 on Figure 9.
Figure 13:
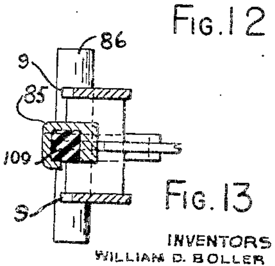
Figure 13 is another enlarged detailed section taken about on the plane represented by the line 13—13 on Figure 7.
Figure 14:
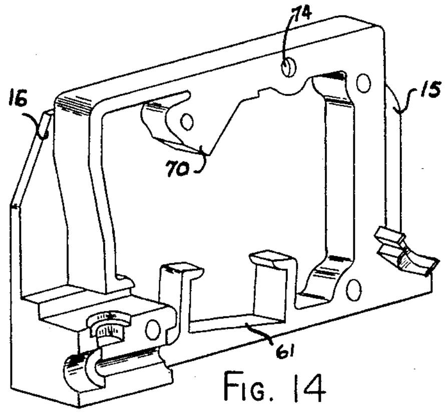
Figure 14 is a detailed perspective of the cover plate per se of the modified embodiment.
Figure 15:
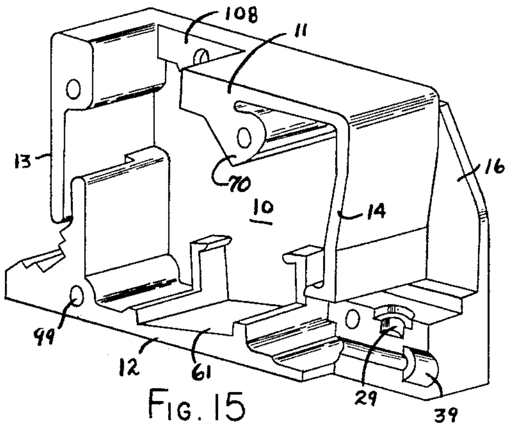
Figure 15 is a detailed perspective of the casing per se of the modified embodiment.
Figure 16:
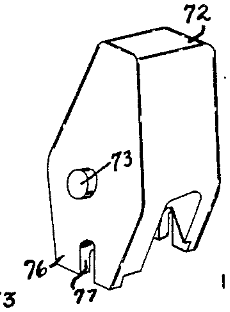
Figure 16 is a detailed perspective of the operating lever of the modified embodiment.
Figure 17:
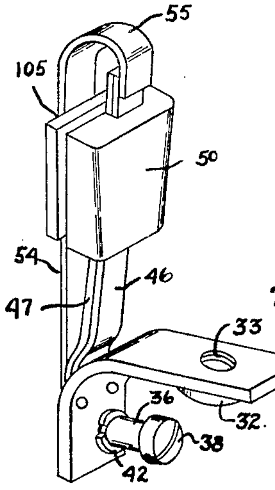
Figure 17 is a detailed perspective of the bimetallic thermostat and elements immediately associated therewith of the modified embodiment.
Figure 18:
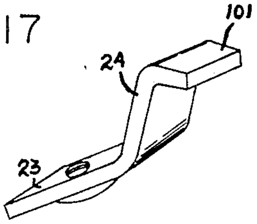
Figure 18 is a detailed perspective of one of the terminal plates of the modified embodiment.

The operation of the alternative embodiment is substantially that of the preferred embodiment. Figure 7 depicts the condition of the various parts in circuit closing position. Figure 8 shows the parts when the circuit has been manually opened, being substantially the same as Figure 2. Figure 9 corresponds to Figure 3 and shows the circuit as having been ruptured by circuit conditions. In this view it will be noted that the detent 107 has been withdrawn from the projection 93 so that the rocker 85 has been actuated by the spring 83 and moved into the position illustrated with the movement limited by the abutment 70.

*Second modification*

Figure 22:
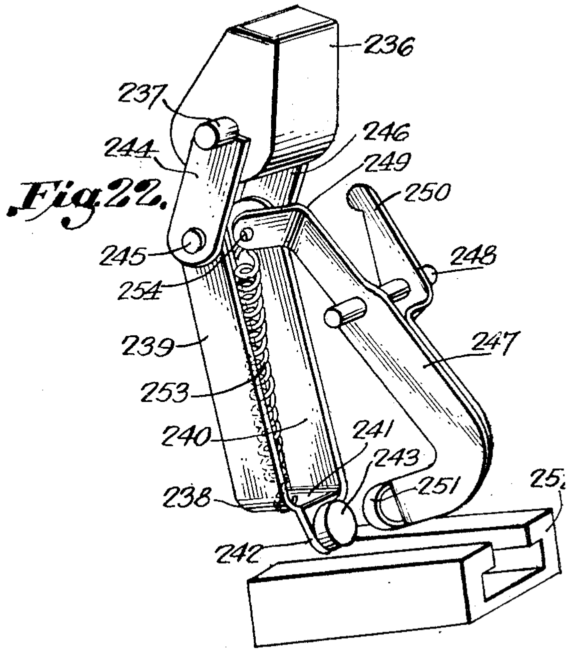
Figure 22 is a detailed perspective of the operating lever, contact carrier, rocker, and parts immediately associated therewith of a second modification.

A second modification of the invention is illustrated in Figure 22. It will be noted that this view is confined to a showing of the operating lever and contact carrier, rocker, spring and magnet. The remainder of the structure in which this assembly is included will be substantially the same as that described for other forms of the invention.

Referring now to Figure 22 a lever is shown at 236 and this lever is provided with a pivotal mounting in the form of trunnions 237 which are adapted to be imbedded in the casing structure. A contact carrier 238 includes spaced side bars 239 and 240 which are joined at the bottom by a bottom wall 241 from which depends a tab 242 that carries the contact 243. A toggle link 244 is pivotally connected to the side bar 239 as shown at 245 and its upper end is formed with a notch that receives one of the trunnions 237. Likewise, another toggle link 246 is pivotally connected to the upper end of the bar 240 and the free end of the link 246 is formed with a notch that receives a trunnion 237.

A rocker is shown at 247 as comprising a pair of plates which are in abutting engagement below the pivot pin 248 and spaced apart above this pivot pin. This spacing provides arms 249 and 250. A contact 251 is carried at the lower end of the rocker 247 and is adapted to engage the contact 243. Both of these contacts are mounted in close proximity to a permanent arc suppressing magnet 252.

A coil tension spring 253 has its upper end anchored to the arm 249 of the rocker 247 as indicated at 254, while its lower end is anchored to the contact carrier 238 as represented by the dotted lines.

It is evident that the assembly shown in Figure 22 may be employed with the usual arrangement of detent, bimetallic thermostat, and electromagnet for causing the rocker 247 to swing on its pivot 248 when a predetermined circuit condition occurs. This rotative movement will be caused by the spring 253 and will take place in a counterclockwise direction. As the rocker rotates the arm 249 will also rotate and move the anchorage for the upper end of the spring past the center 245 of the toggle made up of the carrier 238 and links 242 and 246. The spring 253 will then tend to swing the carrier 241 in a clockwise direction. Thus, the contacts 243 and 251 are separated.

For manual operation the lever 236 is rotated on its axis 237 and the center line of the pivots 245 move to one side or the other of the spring 253, thus causing the latter to bias the carrier either in a counterclockwise direction which urges the contacts in engagement or in a clockwise direction which separates them.

The arm 250 cooperates with the construction now illustrated in resetting the rocker 247 after a rupture has occurred and the circuit condition which caused the rupture removed.

*Third modification*

Figure 23:
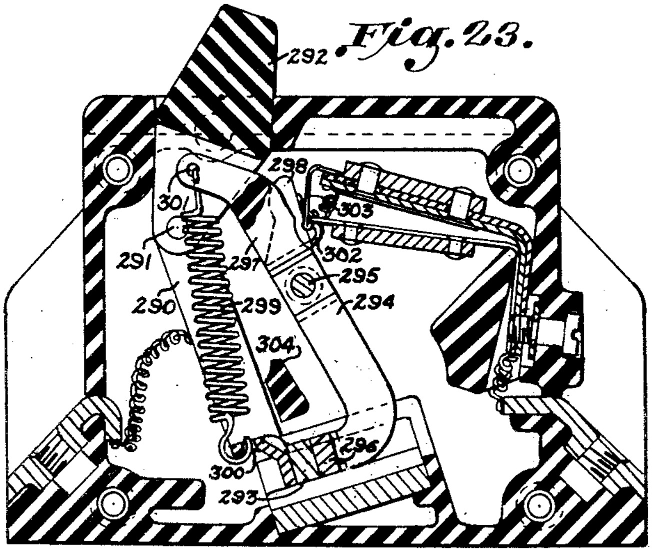
Figure 23 is a longitudinal vertical section through a third modification with the contacts in closed position.

A third modification of the invention is shown in Figure 23. In this figure it will be noted that the contact carrier 290 is pivotally connected at 291 to a lever 292. The lower end of the carrier 290 is provided with a contact 293. A rocker 294 is pivotally mounted as shown at 295 to the casing structure. The lower end of this rocker is provided with a contact 296. The rocker 294 is provided with two arms above the pivot 295, one being shown at 297, the other at 298, the latter being a reset arm.

A tension coil spring 299 has its lower end anchored to the carrier 290 as shown at 300 and its upper end to the arm 297 of the rocker as shown at 301. The rocker 294 is provided with a stop 302 with which is associated the usual detent 303. The detent 303 is controlled by a bimetallic thermostat and a magnet in the manner heretofore described. A stop shown at 304 limits movement of the carrier 290 in a counterclockwise direction.

*Operation third modification*

With the detent 303 cooperating with the stop 302 to hold the rocker 294 against rotation, the lever 292 may be swung to move the center 291 to one side or the other of the spring 299, thereby causing the latter to bias the contact 293 in either open or closed position.

When a predetermined circuit condition occurs the short circuit or overload will cause the detent 303 to be withdrawn from the stop 302. The spring 299 will now rotate the rocker 294 in a counterclockwise direction to withdraw the contact 296 from the contact 293. Movement of the carrier 290 is prevented by the stop 304. After the connection at 301 on the arm 297 has moved sufficiently far to cause the spring 299 to pass to the other side of the center 291 the spring 299 will then be effective to move the carrier 290 in a clockwise direction. Thus the rocker 294 is moved in a counterclockwise direction and the carrier 290 in a clockwise direction.

On the reset operation the lever 292 is swung so that the lower portion thereof engages the reset arm 298, whereupon the rocker 294 is moved in a clockwise direction to again bring the stop 302 into effective engagement with the detent 303.

While preferred specific embodiments of the invention are hereinbefore set forth, it is to be clearly understood that the invention is not to be limited to the exact constructions, devices, and mechanisms illustrated and described because various modifications of these details may be provided in putting the invention into practice within the purview of the appended claims.

What is claimed is:

1. In a combination switch and circuit breaker, a casing, a rocker pivotally mounted in said casing, a contact carried by said rocker, a pivotally mounted contact carrier, a contact carried by said carrier and adapted to engage the contact carried by said rocker, an over-center tension spring having its opposite ends connected to said rocker and said contact carrier to bias the contacts carried by the rocker and carrier toward and away from one another, latch means cooperating with said rocker, instrumentalities under the control of predetermined circuit conditions operatively connected to said latch means, and a manually operable lever for changing the relative positions of the rocker and pivot point of the contact carrier and thereby coincidentally position the spring to exert over-center tensions biasing the rocker and contact carrier to respective contact engaging and disengaging positions.

2. In a combination switch and circuit breaker including a pair of relatively movable contacts as a circuit controlling means, manually operable mechanism for moving one of said contacts, automatic means responsive to predetermined circuit conditions for moving both of said contacts apart in substantially opposite directions, said means comprising a rocker carrying one of said contacts, spring means tensionally interconnecting said rocker and said manually operable mechanism to urge said rocker in a direction to separate said contacts, and a detent associated with said rocker preventing such separating movement.

3. A circuit breaker and switch comprising, a contact carrier, a manually operable lever constituting a shiftable pivotal mounting for said contact carrier, a pivotally mounted rocker, and a tension spring, the said tension spring interconnecting said contact carrier and rocker in opposite overcenter positions in relation to said contact carrier in response to rocking movements of said rocker in opposite directions, and manual operation of said lever causing shifting of the pivotal axis of the contact carrier to respective over-center positions in relation to said spring, said spring biasing said rocker toward pivotal movement in one direction, a latch for restraining said rocker against such movement, said latch being releasable in response to overload circuit conditions, and cooperable contacts carried by said rocker and contact carrier, said contacts being moved into and out of engagement with one another in response to movements of said contact carrier and rocker effectuated through the said over-center positioning of said spring.

4. A combination switch and circuit breaker comprising, a pivotally mounted rocker having a contact at one side of its pivotal axis, a tension spring connected to the rocker at the opposite side of its pivotal axis, a pivotally mounted contact carrier having a contact cooperable with the contact on said carrier, the opposite end of said spring being connected to said contact carrier in such position that when said contacts are in engagement the force axis of said spring passes to one side of the pivot axis of the contact carrier, whereby the tension spring biases the contacts into engagement, and the point of connection of the spring to the rocker being so positioned in relation to the pivotal axis of the contact carrier that pivotal movement of the rocker causes relative shifting of the force axis of the spring to the opposite side of the pivotal axis of the contact carrier, to bias the contacts toward disengagement, a manually operable lever for shifting the pivotal axis of the contact carrier from one side of the spring to the other when the contacts are in engagement, whereby the contacts may be disengaged independently of pivotal movement of the rocker, and means releasable in event of circuit overload conditions, for normally restraining the rocker against pivotal movement.

5. A switch comprising, a pivotally mounted contact carrier, a tension spring connected thereto, means including a pivotally mounted rocker to which said tension spring is connected, for effecting over-center movement of said spring in relation to said contact carrier and thereby producing snap action movement of said contact carrier, and a manually operable lever for shifting the pivotal axis of said contact carrier into over-center relation to said spring and thereby produce snap action movement of said contact carrier independently of pivotal movement of said rocker, the said rocker and contact carrier having cooperable contacts mounted thereby for engagement and disengagement with one another in consequence to the snap action movements of said carrier.

6. A combination switch and circuit breaker comprising, a toggle switch element including a pivotally mounted contact carrier, a contact on said carrier, a tension spring having one end connected to the contact carrier, and a manually operable lever for shifting the pivotal axis of the contact carrier to opposite sides of the force axis of the tension spring, and a protective overload release device in cooperative association with said toggle switch elements, comprising a latch, means responsive to circuit overload for releasing said latch, a pivotally mounted rocker, a contact carried by the rocker at one side of its pivotal axis for cooperable engagement with the contact on said carrier, the said spring having its other end tensionally connected to the rocker at the other side of its pivotal axis for biasing the rocker against the latch, and the point of connection of the spring to the rocker being related to the pivotal point of the contact carrier, when the contacts are engaged, to cause movement of the force axis of the spring from one side of the pivot of the carrier to the other side thereof when the rocker moves pivotally in response to its release by the latch and thereby separates the contacts.

WILLIAM D. BOLLER.
WARREN D. BERKLEY.
WALTER ERNST.
EDWIN W. LANDMEIER.

REFERENCES CITED

The following references are of record in the file of this patent:

UNITED STATES PATENTS

| Number | Name | Date |
|---|---|---|
| 1,023,102 | Badeau | Apr. 9, 1912 |
| 1,848,607 | De Lancey | Mar. 8, 1932 |
| 1,862,631 | Penn | June 14, 1932 |
| 2,027,238 | Lindstrom | Jan. 7, 1936 |
| 2,079,577 | Parsons | May 4, 1937 |
| 2,184,372 | Von Hoorn | Dec. 26, 1939 |
| 2,235,382 | Miller | Mar. 18, 1941 |
| 2,240,007 | Power | Apr. 29, 1941 |
| 2,268,336 | Jackson et al. | Dec. 30, 1941 |
| 2,317,831 | Vaughan et al. | Apr. 27, 1943 |
| 2,320,437 | Jennings | June 1, 1943 |
| 2,320,873 | Lee | June 1, 1943 |
| 2,321,727 | Bardsley | June 15, 1943 |
| 2,325,650 | Baxter | Aug. 3, 1943 |
| 2,328,458 | Jackson et al. | Aug. 31, 1943 |
| 2,360,684 | Jennings | Oct. 14, 1944 |
| 2,367,382 | Taylor | Jan. 16, 1945 |
| 2,424,909 | Adam et al. | July 29, 1947 |
| 2,429,722 | Jennings | Oct. 28, 1947 |